(12) United States Patent
Lambert et al.

(10) Patent No.: US 7,273,997 B2
(45) Date of Patent: Sep. 25, 2007

(54) LASER PROCESSING NOZZLE COUPLING

(75) Inventors: Martin Lambert, Fellbach (DE); Philipp Herwerth, Gerlingen (DE)

(73) Assignee: Trumpf Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 10/913,284

(22) Filed: Aug. 9, 2004

(65) Prior Publication Data

US 2005/0061790 A1 Mar. 24, 2005

(30) Foreign Application Priority Data

Aug. 9, 2003 (EP) ................................. 03018178

(51) Int. Cl.
*B23K 26/00* (2006.01)
(52) U.S. Cl. ................. 219/121.6; 219/121.63
(58) Field of Classification Search ........ 219/121.6–121.86; 285/86
See application file for complete search history.

(56) References Cited

U.S. PATENT DOCUMENTS

| | | | |
|---|---|---|---|
| 3,247,978 A | | 4/1966 | Neumeier |
| 3,761,117 A | * | 9/1973 | Shendure ................. 285/277 |
| 4,114,853 A | * | 9/1978 | Medvick .................. 251/149.6 |
| 4,549,846 A | | 10/1985 | Torii et al. |
| 4,598,581 A | * | 7/1986 | Brekke .................... 73/117.3 |
| 4,733,457 A | * | 3/1988 | Tega et al. .............. 29/709 |
| 4,740,058 A | * | 4/1988 | Hori et al. .............. 359/818 |
| 4,966,398 A | * | 10/1990 | Peterson ................. 285/319 |
| 5,064,991 A | * | 11/1991 | Alborante ............... 219/121.63 |
| 5,074,332 A | * | 12/1991 | Jones ...................... 137/614.06 |
| 5,128,508 A | * | 7/1992 | Klingel ................... 219/121.67 |
| RE34,426 E | * | 11/1993 | Weaver et al. ......... 62/292 |
| 5,896,889 A | * | 4/1999 | Menard ................... 137/614.04 |
| 5,897,795 A | * | 4/1999 | Lu et al. ................. 219/121.57 |
| 6,058,971 A | * | 5/2000 | Palmer et al. .......... 137/599.11 |
| 6,234,274 B1 | * | 5/2001 | van der Griendt ..... 184/105.3 |
| 6,315,544 B1 | * | 11/2001 | Burger et al. .......... 425/151 |
| 6,398,279 B1 | | 6/2002 | Kikut |
| 6,505,863 B2 | * | 1/2003 | Imai ........................ 285/316 |
| 6,534,745 B1 | * | 3/2003 | Lowney .................. 219/121.84 |
| 6,604,944 B2 | * | 8/2003 | Swan ...................... 433/88 |
| 6,761,361 B2 | * | 7/2004 | Taylor et al. ........... 279/75 |
| 6,951,298 B1 | * | 10/2005 | Cogley et al. .......... 227/147 |

FOREIGN PATENT DOCUMENTS

| | | |
|---|---|---|
| DE | 199 44 484 | 4/2001 |
| DE | 100 56 330 | 3/2002 |
| EP | 0 411 535 | 8/1989 |

(Continued)

*Primary Examiner*—Samuel M. Heinrich
(74) *Attorney, Agent, or Firm*—Fish & Richardson P.C.

(57) ABSTRACT

A laser processing nozzle coupling assembly for connecting a laser processing nozzle to a laser processing head includes a hollow sleeve, a laser processing nozzle adapted to be removably coupled to the sleeve, and a collar for coupling the nozzle to the sleeve. The nozzle is displaceable within the sleeve along a longitudinal axis of the sleeve, and the collar is displaceable along a surface outside the sleeve. The sleeve, the nozzle, and the collar are adapted to co-operate to release the nozzle from a locked position within the sleeve when the nozzle is displaced in a first direction within the sleeve and then displaced in a second direction opposite to the first direction.

17 Claims, 6 Drawing Sheets

FOREIGN PATENT DOCUMENTS

| | | |
|---|---|---|
| EP | 0 548 404 | 6/1993 |
| EP | 1 215 018 | 6/2002 |
| GB | 2089918 A * | 6/1982 |
| GB | 2299777 | 10/1996 |
| JP | 02002160085 A * | 6/2002 |

* cited by examiner

LASER PROCESSING NOZZLE COUPLING

This application claims priority under 35 USC §119(a) to patent application serial number EP 03018178.8-2302, filed on Aug. 9, 2003, the entire contents of which is hereby incorporated by reference.

TECHNICAL FIELD

The invention relates to a laser processing nozzle coupling of a nozzle for a laser processing machine.

BACKGROUND

The replacement of laser processing nozzles on a laser processing head of a laser processing machine (e.g., on a laser welding head or on a laser cutting head) is a repetitive process.

A laser cutting head, and, therefore, also the cutting nozzle of a laser cutting system, is especially useful for laser cutting of flat metal sheets. To obtain optimum cutting results for various material thicknesses (e.g., various sheet metal thicknesses), different nozzles are used with the same laser cutting head of the laser cutting system. Sheet metal of various thicknesses can be loaded for processing onto a workpiece support of the laser processing machine using an automatic loader. However, automatic changing of the cutting nozzle is generally not performed. A preliminary requirement for fully automated changing of the nozzle is the optimization of the connection between the cutting nozzle and the laser cutting head. It is generally known to screw laser processing nozzles into a laser processing head, however, rotational motions require generally more effort than are normally performed automatically.

SUMMARY

An apparatus is disclosed herein for simply and safely changing a laser processing nozzle in an automated manner.

A linear motion of a laser processing nozzle is utilized to change the nozzle, and a sliding collar is utilized to release and close (i.e., lock) the laser processing nozzle coupling in its position in the processing head. Thus, an automatic closing mechanism for securing the laser processing nozzle in the laser processing head is achieved, and the linear motion required to change nozzles in the processing head can be automated and carried out by the laser processing machine. The linear motion can be a vertical motion in the direction of the Z-axis of the laser processing head or a horizontal motion relative to the motion of the laser processing head in the direction of the X or Y-axis of the processing head.

Automation of the laser processing nozzle change requires no rotational motion, because the coupling can be opened and also closed by a simple linear motion sequence that extends only in one axial direction. These motions are combined with the radial motion of at least one moveable ball that is held in the processing head to precisely realize opening and closing of the coupling with two linear motions, i.e., the motion of the laser processing nozzle and the motion of the sliding collar. Towards this end, a hollow sleeve in the processing head includes at least one bore for receiving the ball(s) that can be displaced in a radial direction. In the closed position of the processing nozzle coupling, the ball(s) can be secured toward the inside direction of the bore to achieve coupling actuation. However, the ball(s) can be displaced in the hollow sleeve toward the outside of the bore by the sliding collar to achieve coupling actuation. The direction of coupling actuation defines the direction of motion for releasing or locking the coupling and may be defined by the Z-, X-, or Y-direction.

The laser processing nozzle and the sliding collar include a shoulder and/or inclined surfaces for clamping the ball and free spaces for releasing the laser processing nozzle coupling. The ball(s) can be locked to prevent inadvertent release of the coupling by loading the laser processing nozzle in the direction of an outlet opening of the laser beam by using a spring element, such as, for example, a bellows-type spring and loading the sliding collar by a pressure spring in the direction of the outlet opening. The bellow-type spring also provides hermetic sealing.

A lip on the bore prevents the ball(s) from falling out of the bores of the hollow sleeve when the laser processing nozzle is removed.

A sliding sleeve is disposed above the laser processing nozzle (as viewed in the direction of coupling actuation or direction of motion of the sliding sleeve), and the spring element can act through the sliding sleeve on the laser processing nozzle. When the laser processing nozzle is removed, the sliding sleeve maintains the ball(s) in their radial position and assumes the function of the laser processing nozzle. The pressure spring is thereby biased. At the same time, the sliding collar cannot move downwardly due to the position and locking of the ball(s).

To facilitate actuation, especially automatic actuation, the sliding collar can include a working surface for an auxiliary part for displacing the sliding collar. The laser processing nozzles can be changed with a purely mechanical actuating device, requiring no auxiliary energy, because the axis of the laser processing head can perform the required motions.

In a first aspect, a laser processing nozzle coupling assembly for connecting a laser processing nozzle to a laser processing head includes a hollow sleeve, a laser processing nozzle adapted to be removably coupled to the sleeve, and a collar for coupling the nozzle to the sleeve. The nozzle is displaceable within the sleeve along a longitudinal axis of the sleeve, and the collar is displaceable along a surface outside the sleeve. The sleeve, the nozzle, and the collar are adapted to co-operate to release the nozzle from a locked position within the sleeve when the nozzle is displaced in a first direction within the sleeve and then displaced in a second direction opposite to the first direction.

The assembly can include one or more of the following features. For example, the sleeve can include at least one bore through the sleeve, with at least one ball being held within the at least one bore and being displaceable within the bore between an inner position and an outer position. When the nozzle is in the locked position, the ball is held in the inner position by a portion of the nozzle located within the sleeve and by a portion of the collar that is displaceable along the surface outside the sleeve. The sleeve can include three bores through the sleeve, with a ball being held in each of the three bores and displaceable within the bore between an inner position and an outer position. When the nozzle is in the locked position, the each ball is held in the inner position by a portion of the nozzle located within the sleeve and by a portion of the collar that is displaceable along the surface outside the sleeve. The balls can be arranged around a circumference of the sleeve at substantially equal distances from each other.

The assembly can include at least one spring configured to apply a force on the nozzle and on the collar in a direction in which a laser beam is emitted from the nozzle. The collar can include at least one recess into which the at least one ball is displaced when the nozzle is released from the sleeve. The nozzle can include an outer surface that is inclined with respect to an inner surface of the sleeve and that displaces the at least one ball within the bore when the nozzle is displaced within the sleeve. The collar can include a flange upon which the spring applies the force and that applies the force to a flange of the nozzle.

The collar can be adapted to be displaced automatically. The collar can include a flange that can be grasped automatically to displace the nozzle in the first direction and in the second direction.

The first direction and the second direction can be substantially parallel to the direction of a laser beam emitted from the nozzle. The first direction and the second direction also can be substantially perpendicular to the direction of a laser beam emitted from the nozzle.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION

Figure 1:
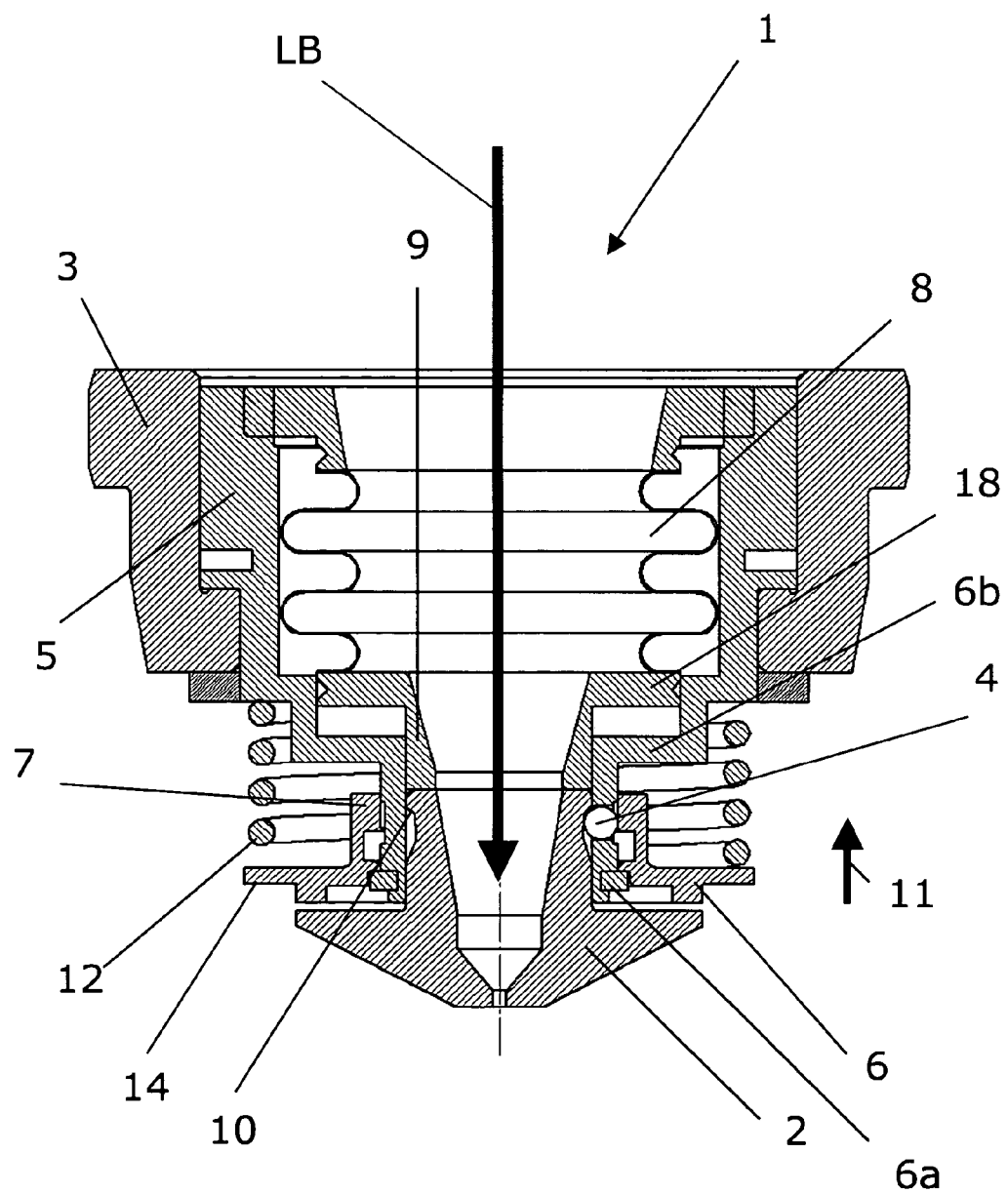
FIG. 1 is longitudinal sectional view through a laser processing nozzle coupling of a laser processing head with a laser processing nozzle, with the laser processing nozzle in a closed position.

FIG. 1 shows the structure of a laser processing nozzle coupling 1 with a rotationally symmetrical design. A reversibly connectable laser processing nozzle 2 with a nozzle opening for a laser beam LB is in a locked position when the laser processing nozzle coupling 1 is closed, which position is obtained through positive locking of corresponding functional surfaces and components explained in detail below. The components of the laser processing nozzle coupling 1 are connected to an associated holder 3 through which the laser processing nozzle coupling 1 is connected to further parts of the laser processing head. The laser processing nozzle 2 is held in a positive-locking manner through one or more balls 4 disposed on the periphery of the processing nozzle (e.g., three balls, disposed at a separation of 120° and having a spherical diameter of approximately 2 mm). In FIG. 1, only one of the balls 4 is visible due to the distribution of the balls 4. The balls 4 are disposed in a bore of a hollow sleeve 5 such that they can move in a radial direction. A sliding collar 6 delimits the radial motion of the balls 4 to the outside, since a section 7 of the sliding collar 6 abuts the balls 4. The sliding collar 6 is disposed to be displaceable between a first stop formed by a snap ring 6a (disposed in a groove) and a second stop 6b. The sliding collar 6 may be regarded as a substantially actuating element of the laser processing nozzle coupling 1, which must be grasped or actuated for an automated nozzle change. The laser processing nozzle 2 delimits the radial motion of the balls 4 to the inside direction.

A sliding sleeve 9 is pressed downwardly through a metal bellows spring 8. The bellows spring 8 forces the sliding sleeve 9 downwardly when a laser processing nozzle 2 is not inserted in the processing nozzle coupling 1. Moreover, the spring force prevents the laser processing nozzle 2 from moving upwardly out of its defined position due to slight perturbations. Thus, the balls 4 are forced against the sliding collar 6 through a circumferential chamfer 10 on the laser processing nozzle 2. The position of the laser processing nozzle 2 is thereby radially fixed by the hollow sleeve 5 and axially fixed by the balls 4. Suitable cooperation between the sliding collar 6 and the sliding sleeve 9 necessitates no auxiliary motion to change the laser processing nozzle 2. The laser processing nozzle properly snaps shut, as explained herein, particularly with reference to FIGS. 2-4.

Figure 2:
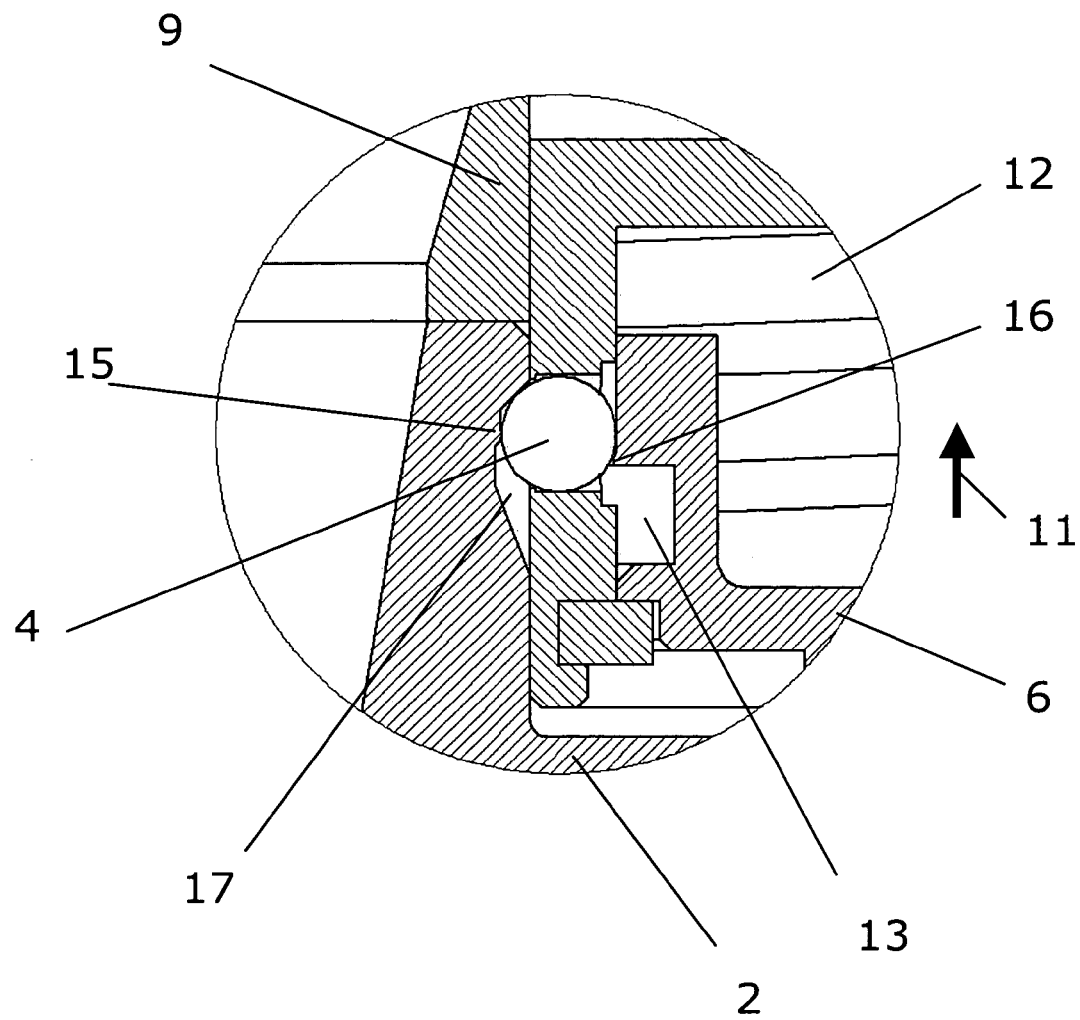
FIG. 2 is a detailed sectional view of the laser processing nozzle coupling in a first position.
Figure 3:
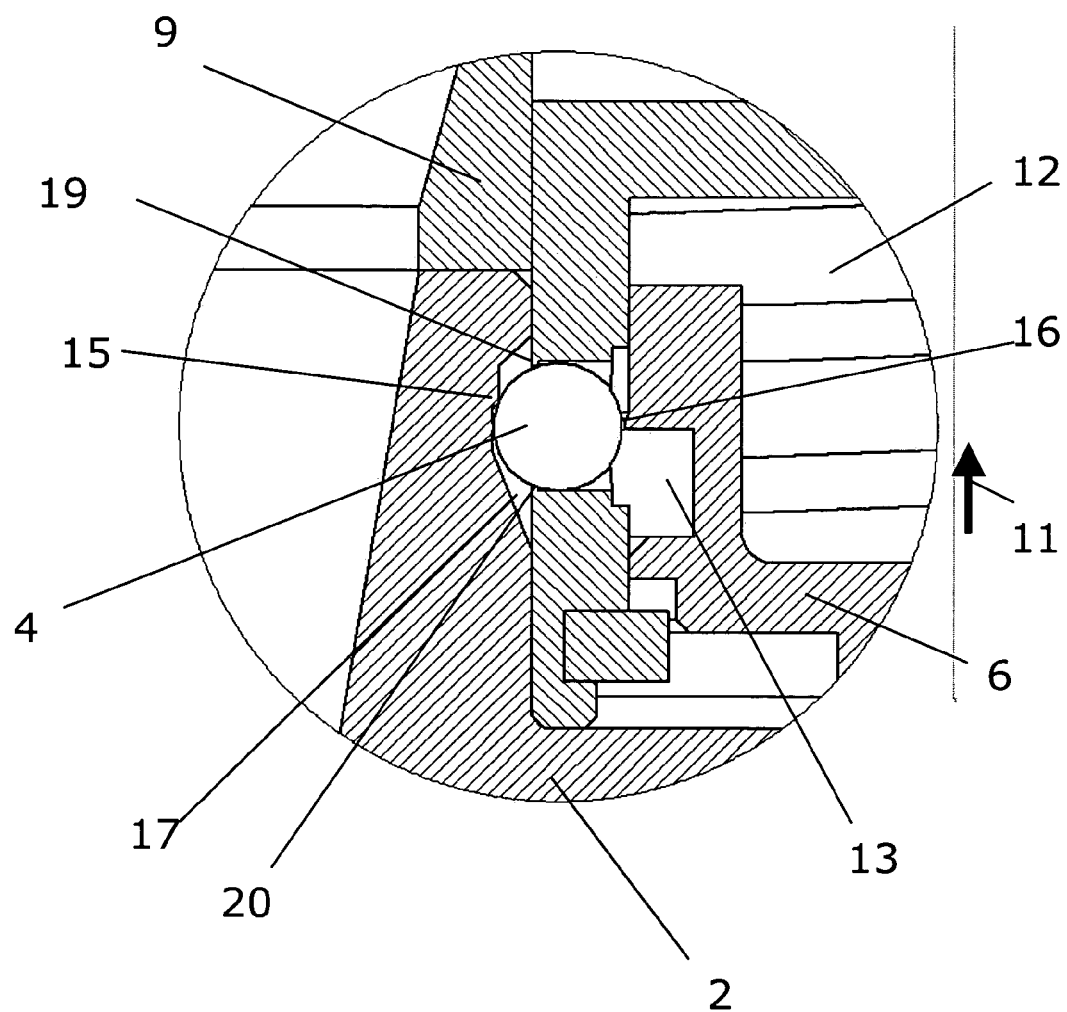
FIG. 3 is a detailed sectional view of the laser processing nozzle coupling in a second position.
Figure 4:
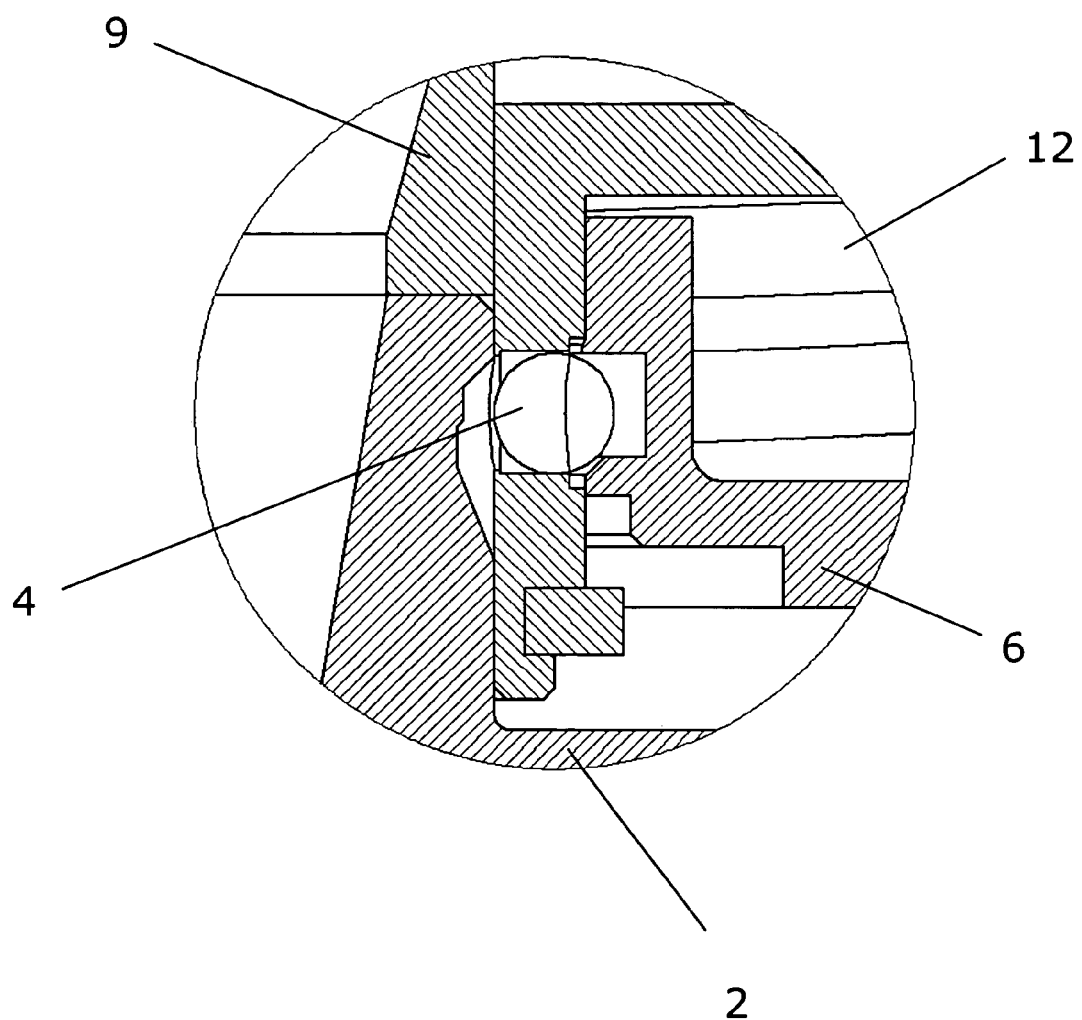
FIG. 4 is a detailed sectional view of the laser processing nozzle coupling in a third position.

The sequence of FIGS. 2-4 exemplarily shows the release of the laser processing nozzle coupling 1. An opposite closing sequence can be easily imagined on the basis of this sequence.

To release the laser processing nozzle coupling 1, the balls 4 must be pushed radially to the outside. This can be accomplished by pushing the sliding collar 6 upwardly in the direction of coupling actuation 11 (i.e., in the Z-direction) against the spring force of a pressure spring 12, as shown in FIG. 1, whereby the balls 4 withdraw into an annular space 13. The pressure spring 12 holds the sliding collar 6 in a defined position to prevent slight motions on the sliding collar 6 from opening the laser processing nozzle coupling 1. The sliding collar 6 is actuated through the application of manual force or through a corresponding device or corresponding auxiliary part, such as, for example, a ring that can be disposed onto the edge 14 of the sliding collar 6 and that can be pressure-loaded, as shown in FIG. 1.

In the position shown in FIG. 2, pushing up of the sliding collar 6 is not yet possible because the balls 4 are clamped between a first circumferential shoulder 15 and an inclined surface such that the ball 4 abuts on the laser processing nozzle 2 and a second circumferential shoulder 16 of the sliding collar 6 that juts out in the radial direction from the sliding collar 6. The balls 4 prevent an upward motion of the sliding collar 6, because the shoulder 16 cannot pass the balls 4. This requires previous motion of the laser processing nozzle 2. The shoulder 16 secures the laser processing nozzle 2 from inadvertently falling out of the nozzle coupling 1 the when the sliding collar 6 is inadvertently pushed upwardly. The balls 4 are clamped thereby preventing inadvertent release of the laser processing nozzle coupling 1.

To release the nozzle 2, the laser processing nozzle 2 must initially be pushed upwardly, as shown in FIG. 3. Lips 19 and 20 on the outer edge of the bore prevents the balls 4 from falling out of the bore after removal of the laser processing nozzle 2. Radial inward motion of the balls 4 is possible only up to the lips 19 and 20. The balls 4 can withdraw into the space 17 on the inner side that becomes free when the nozzle 2 is pushed upwardly, whereby the sliding collar 6 (see also FIG. 4) can be pushed upwardly, as the balls 4 are then in a position that the shoulder 16 can move past the balls 4. The balls 4 can subsequently withdraw in a radial direction into the annular space 13. The laser processing nozzle coupling 1 can be released only through the combination of motions, because the balls 4 can be displaced radially inwardly and outwardly, respectively.

Figure 5:
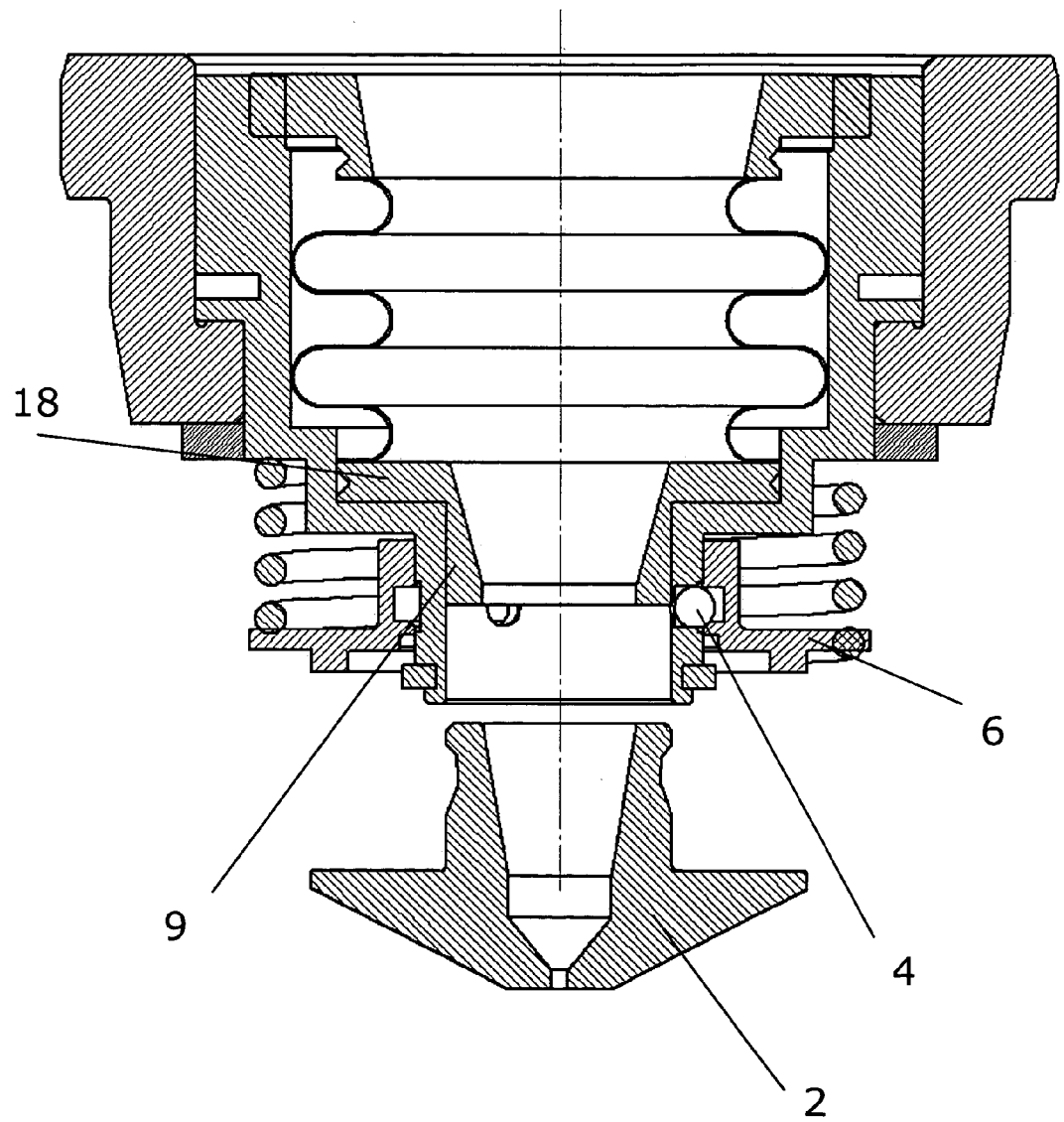
FIG. 5 is a detailed longitudinal sectional view through the opened laser processing nozzle coupling of the laser processing head with laser processing nozzle released from the laser processing head.

The bellows spring 8 exerts a force on the laser processing nozzle 2 though the sliding sleeve 9, which forces the laser processing nozzle 2 in a downward direction. The motion of the sliding sleeve 9 is delimited by a flange 18 (compare FIGS. 1 and 5). In this position, the sliding sleeve 9 fixes the balls in their radially outwardly pushed position, whereby the sliding collar 6 is locked by the balls 4. The pressure spring 12 remains biased, even if external application of force for actuation on the sliding collar 6 is omitted. When the laser processing nozzle coupling 1 is tensioned in this fashion, an additional laser processing nozzle 2 can be affixed to the coupling 1 without external actuation through axial insertion in the following manner. The laser processing nozzle 2 initially exerts a force onto the sliding sleeve 9, pushing it upwardly, and the balls 4 withdraw into the tapering on the laser processing nozzle 2. The sliding collar 6 is thereby no longer axially supported and jumps into the position shown in FIG. 1 due to the spring bias. The laser processing nozzle 2 is affixed.

Reception of the laser processing nozzle 2 and closure of the laser processing nozzle coupling 1 are effected analogously in a reverse order than the above-described release of the laser processing nozzle coupling 1.

Biasing of the laser processing nozzle coupling 1 greatly accelerates replacement by a new laser processing nozzle due to the sliding collar 6, which is held in the upper position by the balls 4. The pressure spring 12 participates in biasing the coupling 1, as does the bellows spring 8. When the laser processing nozzle 2 is removed, the sliding sleeve 9 holds the balls 4 in the radial position and assumes the function of the laser processing nozzle 2, and the pressure spring 12 is thereby biased. At the same time, the sliding collar 6 cannot move downwardly due to the position and locking of the balls 4. Therefore, the coupling 1 can snap shut automatically without external influence when the next laser processing nozzle 2 is received. If a laser processing nozzle 2 is inserted from below, it initially forces the sliding sleeve 9 upwardly against the spring force. The sliding collar 6 has no function in this process. The laser processing nozzle 2 exerts a pressure until the smallest nozzle diameter is at the level of the balls 4, thereby permitting motion of the balls 4 in the direction of the beam axis, i.e., towards the center axis of the nozzle 2. When the balls 4 move in this direction, they permit a downward movement of the sliding collar 6 that was not possible up to now due to its shoulder 16. This downward motion is supported by the spring force of the pressure spring 12. The pressure spring 12 forces the sliding collar 6 again onto the stop thereby fixing the laser processing nozzle 2. Replacement of the laser processing nozzle 2 is possible without external assistance to move components.

Figure 6:
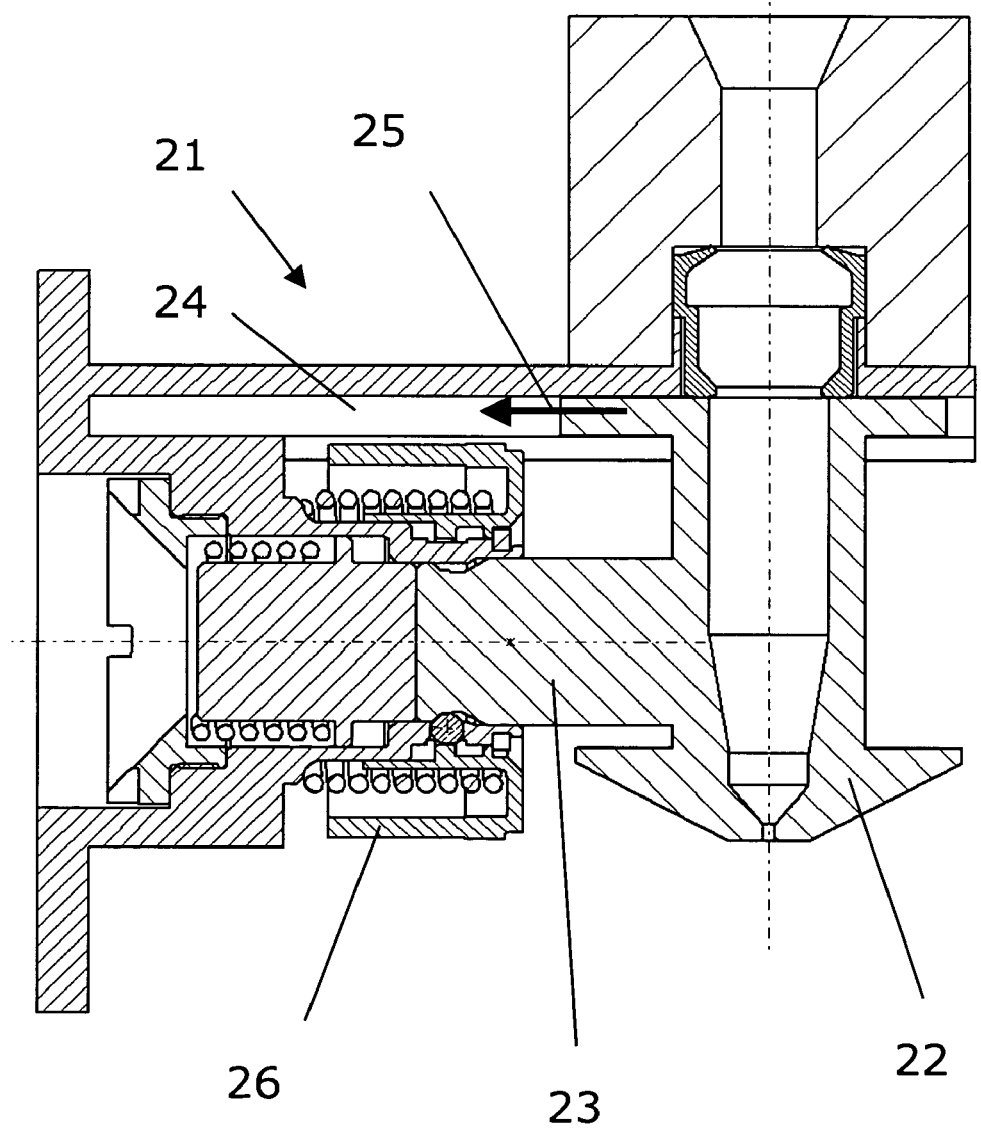
FIG. 6 is a longitudinal sectional view through a laser processing nozzle coupling of a laser processing head with a laser processing nozzle, with the laser processing nozzle in a closed position.

As shown in FIG. 6, an arrangement of a laser processing nozzle coupling 21 in which the nozzle 22 is coupled to the couple 21 by moving the nozzle in the X- or Y-direction (i.e., references numeral 25 shows the direction of coupling actuation) is also possible. The coupling mechanism for releasing and closing is unchanged in principle, however, the sliding collar 26 and the laser processing nozzle 22 are displaced transversely to the laser beam, rather than vertically. The laser processing nozzle 22 is laterally coupled by a nozzle section 23. Guidance in a groove 24 permits lateral motion.

A number of implementations invention have been described. Nevertheless, it will be understood that various modifications may be made. Accordingly, other implementations are within the scope of the following claims.

OTHER EMBODIMENTS

A number of embodiments of the invention have been described. Nevertheless, it will be understood that various modifications may be made. Accordingly, other embodiments are within the scope of the following claims.

What is claimed is:

1. A laser processing nozzle coupling assembly for connecting a laser processing nozzle to a laser processing head, the assembly comprising:
 a hollow sleeve;
 a laser processing nozzle adapted to be removably coupled to the sleeve, wherein the nozzle is displaceable within the sleeve along a longitudinal axis of the sleeve and wherein in a locked position the nozzle is displaceable only in a first direction within the sleeve;
 a collar for coupling the nozzle to the sleeve, wherein the collar is displaceable along a surface outside the sleeve and wherein the sleeve, the nozzle, and the collar are adapted to cooperate to release the nozzle from the locked position within the sleeve
 wherein in the locked position of the nozzle, the collar is not movable to release the nozzle and
 wherein the collar is movable for releasing the nozzle when the nozzle is displaced in the first direction and
 wherein the nozzle is releasable in a second direction opposite to the first direction when the collar has been moved for releasing the nozzle.

2. The laser processing nozzle coupling assembly of claim 1, wherein the sleeve comprises at least one bore through the sleeve, and further comprising:
 at least one ball held within the at least one bore and displaceable within the bore between an inner position and an outer position,
 wherein when the nozzle is in the locked position, the ball is held in the inner position by a portion of the nozzle located within the sleeve and by a portion of the collar that is displaceable along the surface outside the sleeve.

3. The laser processing nozzle coupling assembly of claim 2, wherein the sleeve comprises three bores through the sleeve, and further comprising:
 a ball held each of the three bores and displaceable within the bore between an inner position and an outer position,
 wherein when the nozzle is in the locked position, the each ball is held in the inner position by a portion of the nozzle located within the sleeve and by a portion of the collar that is displaceable along the surface outside the sleeve.

4. The laser processing nozzle coupling assembly of claim 3, wherein the balls are arranged around a circumference of the sleeve at substantially equal distances from each other.

5. The laser processing nozzle coupling assembly of claim 1, further comprising a first spring configured to apply a force on the nozzle in the second direction.

6. The laser processing nozzle coupling assembly of claim 1, wherein the collar includes at least one recess into which the at least one ball is displaced when the nozzle is released from the sleeve.

7. The laser processing nozzle coupling assembly of claim 1, wherein the nozzle includes an outer surface that is inclined with respect to an inner surface of the sleeve and that displaces the at least one ball within the bore when the nozzle is displaced within the sleeve.

8. The laser processing nozzle coupling assembly of claim 1, further comprising a second spring configured to apply a force on the collar in the second direction.

9. The laser processing nozzle coupling assembly of claim 1, wherein the collar is adapted to be displaced automatically.

10. The laser processing nozzle coupling assembly of claim 9, wherein the collar includes a flange that can be grasped automatically to displace the collar in the first direction and in the second direction.

11. The laser processing nozzle coupling assembly of claim 1, wherein the first direction and the second direction are substantially parallel to the direction of a laser beam emitted from the nozzle.

12. The laser processing nozzle coupling assembly of claim 1, wherein the first direction and the second direction are substantially perpendicular to the a laser beam emitted from the nozzle.

13. The laser processing nozzle coupling assembly of claim 5, further comprising a sliding sleeve through which the first spring interacts with the nozzle.

14. The laser processing nozzle coupling assembly of claim 2, wherein an outer surface of the nozzle defines a space that receives a first part of the at least one ball when the nozzle is in the locked position, wherein the space is enlarged in the second direction to receive the first as well as a second part of the at least one ball when the nozzle is displaced in the first direction.

15. The laser processing nozzle coupling assembly of claim 14, wherein a displacement of the collar in the first direction is blocked by the at least one ball when only the first part of the at least one ball is received in the space and wherein a displacement of the collar in the first direction is enabled when also the second part of the at least one ball is received in the space.

16. The laser processing nozzle coupling assembly of claim 15, wherein the collar is displaceable in the first direction to align a recess of the collar with the bore so that the ball can move into the recess and thereby into the outer position.

17. The laser processing nozzle coupling assembly of claim 1, wherein the collar is displaceable in the first direction when the nozzle is displaced in the first direction, placing the collar in an unlocked position.

* * * * *